United States Patent
Li et al.

(10) Patent No.: US 10,725,922 B2
(45) Date of Patent: Jul. 28, 2020

(54) TECHNOLOGIES FOR PREDICTIVE FILE CACHING AND SYNCHRONIZATION

(71) Applicant: Intel Corporation, Santa Clara, CA (US)

(72) Inventors: Hong Li, El Dorado Hills, CA (US); Sudip S. Chahal, Gold River, CA (US); Roy J. Ubry, Folsom, CA (US); Julian Braham, Haifa (IL); Preeta Banerji, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 977 days.

(21) Appl. No.: 14/750,618

(22) Filed: Jun. 25, 2015

(65) Prior Publication Data
US 2016/0378665 A1 Dec. 29, 2016

(51) Int. Cl.
*G06F 12/0871* (2016.01)
*G06F 12/0862* (2016.01)
*G06F 16/172* (2019.01)
*G06F 16/178* (2019.01)

(52) U.S. Cl.
CPC ...... *G06F 12/0871* (2013.01); *G06F 12/0862* (2013.01); *G06F 16/172* (2019.01); *G06F 16/178* (2019.01); *G06F 2212/1016* (2013.01); *G06F 2212/154* (2013.01); *G06F 2212/263* (2013.01); *G06F 2212/282* (2013.01); *G06F 2212/314* (2013.01); *G06F 2212/463* (2013.01); *G06F 2212/6024* (2013.01)

(58) Field of Classification Search
CPC .............................. G06F 16/172; G06F 16/178
See application file for complete search history.

(56) References Cited

U.S. PATENT DOCUMENTS

| | | | |
|---|---|---|---|
| 5,305,389 A | 4/1994 | Palmer | |
| 7,225,211 B1 * | 5/2007 | Colgrove | ............. G06F 16/185 707/693 |
| 8,626,791 B1 | 1/2014 | Lin | |
| 8,855,189 B1 * | 10/2014 | Krause | ........... H04N 21/234309 375/240 |

(Continued)

FOREIGN PATENT DOCUMENTS

WO   2010-075272   7/2010

OTHER PUBLICATIONS

International Search Report for PCT/US16/034055, dated Sep. 12, 2016 (3 pages).

(Continued)

*Primary Examiner* — Charles E Lu
(74) *Attorney, Agent, or Firm* — Barnes & Thornburg LLP (57) ABSTRACT

Technologies for predictive caching include a computing device to receive sensor data generated by one or more sensors of the computing device and determine a device context of the computing device based on the sensor data. Based on the device context, the computing device determines a file to cache that has similar characteristics to another file recently accessed by a user of the computing device. The computing device includes a file cache with a first partition to store files identified to have similar characteristics to files recently accessed by a user and a second partition to store files identified based on access patterns of the user. The computing device stores the determined file to the first partition.

24 Claims, 6 Drawing Sheets

(56) References Cited

U.S. PATENT DOCUMENTS

| | | | |
|---|---|---|---|
| 2005/0096936 A1* | 5/2005 | Lambers | G06Q 10/087 725/135 |
| 2007/0260476 A1* | 11/2007 | Smolen | G06F 16/2308 705/1.1 |
| 2012/0284463 A1 | 11/2012 | Srinivasan | |
| 2013/0074142 A1 | 3/2013 | Brennan | |
| 2013/0077097 A1 | 3/2013 | Engstrand | |
| 2013/0232121 A1* | 9/2013 | Tucker | G06F 16/176 707/655 |
| 2014/0095943 A1* | 4/2014 | Kohlenberg | H04W 4/029 714/47.3 |
| 2014/0189037 A1 | 7/2014 | Stockwell | |
| 2015/0127607 A1* | 5/2015 | Savage | G06F 16/178 707/610 |

OTHER PUBLICATIONS

Written Opinion for PCT/US16/034055, dated Sep. 12, 2016 (4 pages).

Extended European search report for European patent application No. 16814949.0, dated Dec. 13, 2019 (9 pages).

\* cited by examiner

TECHNOLOGIES FOR PREDICTIVE FILE CACHING AND SYNCHRONIZATION

BACKGROUND

The use of "lightweight" computing devices online and offline to perform significant amounts of work (e.g., editing documents, drafting emails, listening to music, etc.) has proliferated in recent years. Such offline tasks often rely heavily on file caching, which involves locally storing files to reduce network overhead and delay in file retrieval. File caching is predominantly used by web servers, for example, to reduce network bandwidth usage, latency and server usage. Traditional caching schemes often involve storing and deleting small amounts of content in a non-distinguishing manner. As a result, computing devices employing traditional caching techniques often cache content that is never used again by the user and/or prematurely delete content that is still needed (e.g., because a predetermined period for storing the content has expired).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
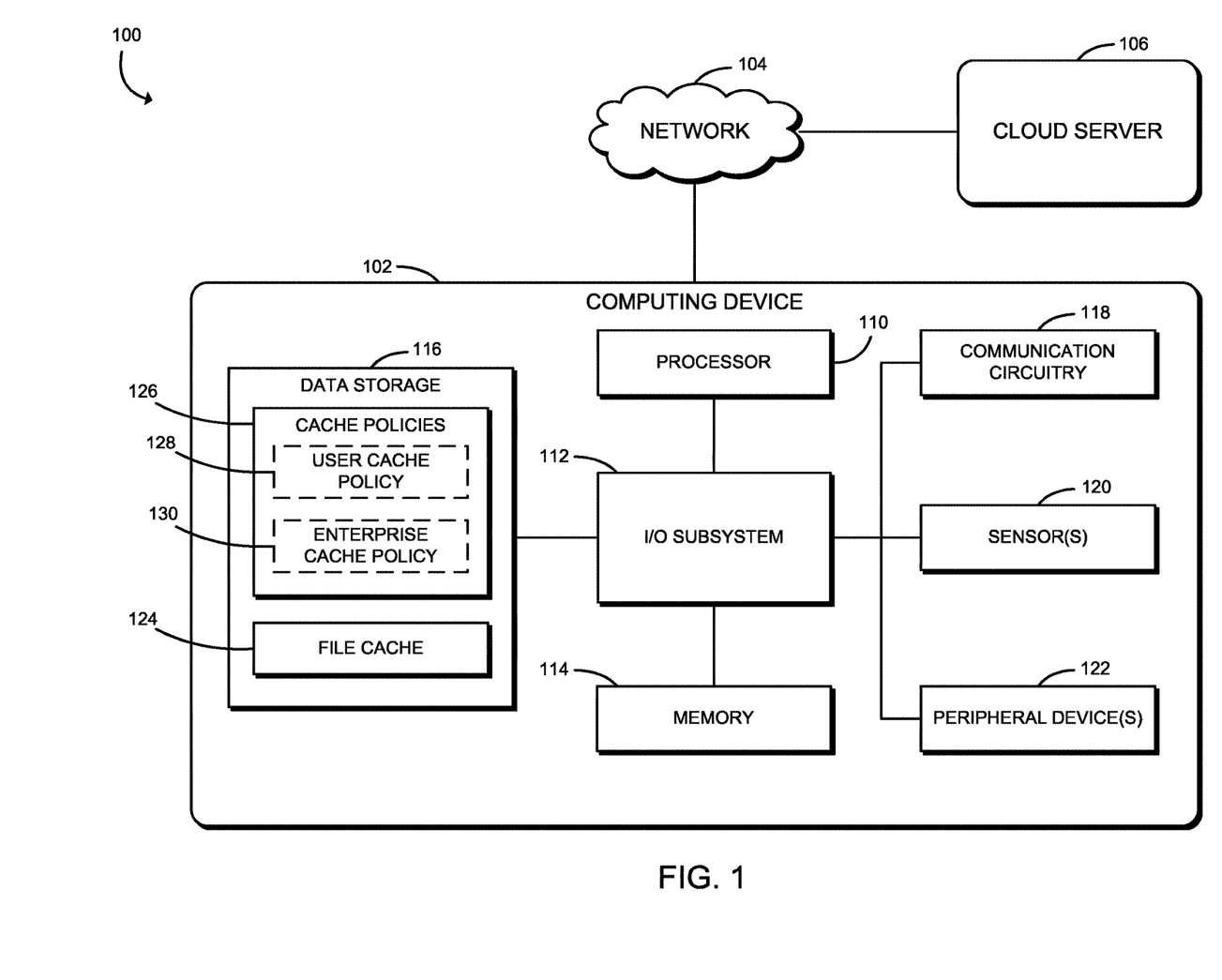
FIG. 1 is a simplified block diagram of at least one embodiment of a system for file caching and synchronization.

Referring now to FIG. 1, a system 100 for file caching and synchronization includes a computing device 102, a network 104, and a cloud server 106. As described in detail below, in the illustrative embodiment, the computing device 102 may determine a device context of the computing device 102 based on generated sensor data and predictively cache files (e.g., from the cloud server 106) for subsequent use by the computing device 102. For example, in some embodiments, the computing device 102 may identify and cache files that are similar (e.g., include similar characteristics) to other files recently accessed by a user of the computing device 102. Additionally, as described below, the computing device 102 may synchronize the files across the system 100 by storing modified cache files to the cloud server 106. It should be appreciated that the file caching and synchronization techniques described herein may more effectively cache files than traditional techniques while, for example, reducing storage requirements (e.g., by more intelligently identifying files to cache) and addressing various security concerns (e.g., by reducing the amount of content cached to a device at a particular point in time). Further, in some embodiments, the illustrative techniques may improve the cache hit rate of a particular computing device.

The illustrative computing device 102 may be embodied as any type of computing device capable of performing the functions described herein. For example, the computing device 102 may be embodied as a laptop computer, tablet computer, notebook, netbook, Ultrabook™, cellular phone, smartphone, wearable computing device, personal digital assistant, mobile Internet device, Hybrid device, desktop computer, server, router, switch, and/or any other computing/communication device. As shown in FIG. 1, the illustrative computing device 102 includes a processor 110, an input/output ("I/O") subsystem 112, a memory 114, a data storage 116, a communication circuitry 118, one or more sensors 120, and one or more peripheral devices 122. Of course, the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

Figure 6:
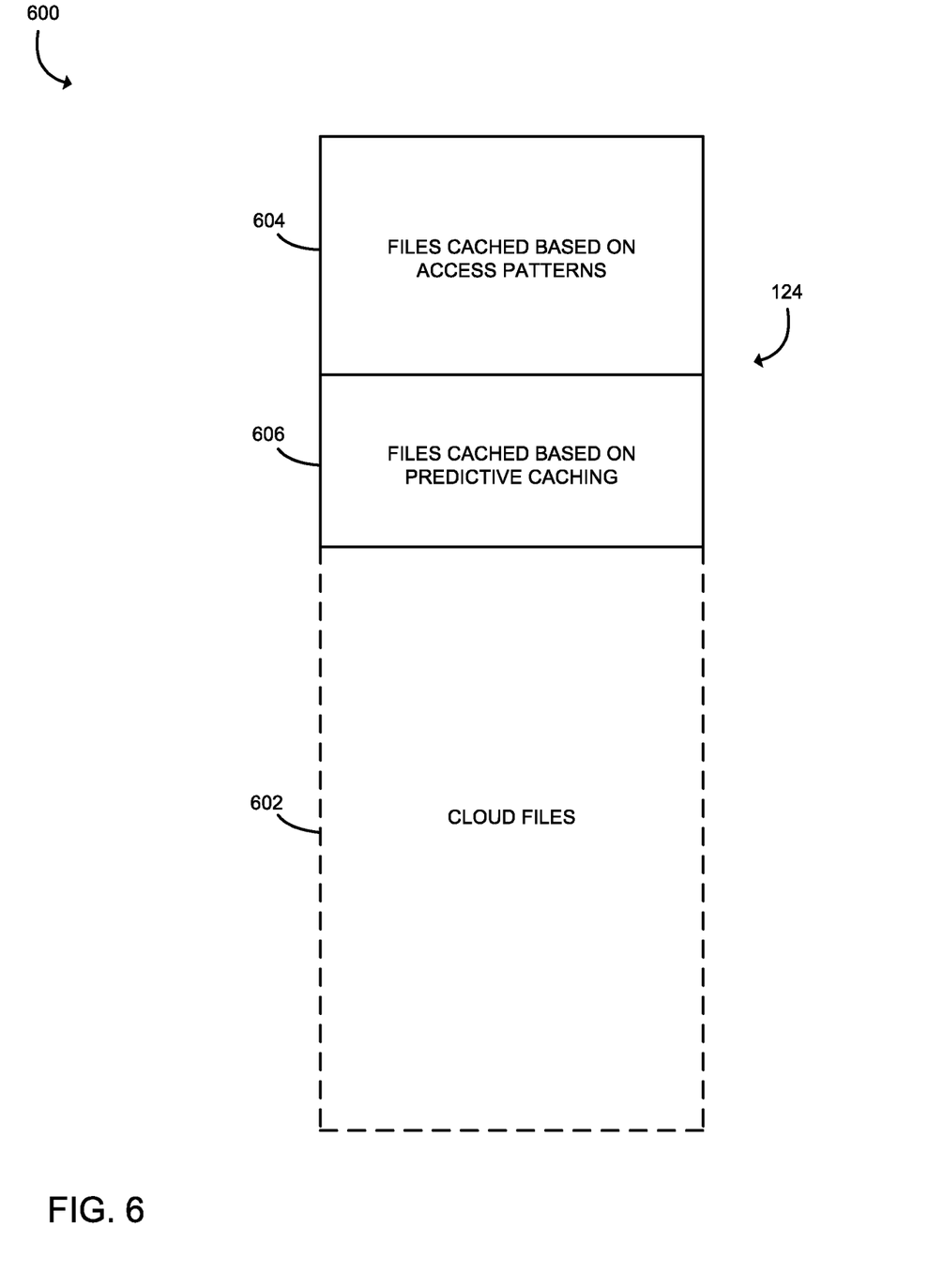
FIG. 6 is a simplified block diagram of at least one embodiment of a file namespace of the system of FIG. 1.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 102 as described herein. For example, in the illustrative embodiment, the data storage 116 includes a file cache 124 and one or more cache policies 126. The file cache 124 is configured to store cached files for the computing device 102 as described herein. In some embodiments, the file cache 124 may form a portion of the data storage 116 and/or the memory 114. It should be appreciated that the files utilized by the system 100 may be stored to a file namespace 600 shown in FIG. 6. As shown, the illustrative file namespace 600 includes the file cache 124 and cloud files 602 (e.g., files stored on the cloud server 106 or elsewhere in a cloud computing environment). Additionally, the file cache 124 in the illustrative file namespace 600 includes two partitions: a partition 604 configured to store files identified based on access patterns of a user of the computing device 102 and a partition 606 configured to store files identified to be similar (e.g., have similar characteristics) to files recently accessed by the user of the computing device 102. It should be appreciated that, in some embodiments, each of the partitions 604, 606 may be distributed across the memory 114 and/or the data storage 116. In some embodiments, the partitions 604, 606 may be determine dynamically such that the amount of storage space used by each of the partitions 604, 606 may differ and/or vary over time.

The cache policies 126 include rules for caching files by the computing device 102. Depending on the particular embodiment, the cache policies 126 may include a user cache policy 128 (e.g., including user-defined rules for caching files) and/or an enterprise cache policy 130 (e.g., including rules for caching files in an enterprise environment of the computing device 102). The cache policies 126 may include rules related to device type, capacity, available storage, network connectivity, location, time, user context, environment, and/or other characteristics. In some embodiments, the rules may identify files that "must" always be cached and/or files that "must not" ever be cached. For example, the cache policies 126 may include a rule that identifies a particular location as unsecure such that one or more cached files should be deleted if the computing device 102 is determined to be at the particular location.

The communication circuitry 118 may be embodied as any communication circuit, device, or collection thereof, capable of enabling communications between the computing device 102 and other remote devices (e.g., the cloud server 106) over the network 104. The communication circuitry 118 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The sensors 120 may be embodied as any sensors configured to generate data/signals indicative of an environment or context of the computing device 102 and/or user of the computing device 102. In various embodiments, the sensors 120 may be embodied as, or otherwise include, for example, inertial sensors (e.g., an inertial measurement unit), position sensors (e.g., GPS sensors/systems), proximity sensors, optical sensors, light sensors, audio sensors, temperature sensors, motion sensors, piezoelectric sensors, cameras, and/or other types of sensors. Of course, the computing device 102 may also include components and/or devices configured to facilitate the use of the sensor(s) 120. Depending on the particular embodiment, the sensors 120 may include hardware sensors and/or software sensors (e.g., to determine calendar events and other application data).

The peripheral devices 122 may include any number of additional peripheral or interface devices, such as speakers, microphones, additional storage devices, and so forth. The particular devices included in the peripheral devices 122 may depend on, for example, the type and/or intended use of the computing device 102.

The network 104 may be embodied as any type of communication network capable of facilitating communication between the computing device 102 and remote devices (e.g., the cloud server 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The cloud server 106 may be embodied as any type of computing device capable of performing the functions described herein. For example, in some embodiments, the cloud server 106 may be similar to the computing device 102 as described above. That is, the cloud server 106 may be embodied as a server, a rack-mounted server, a blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device. Further, the cloud server 106 may include components similar to those of the computing device 102 discussed above. The description of those components of the computing device 102 is equally applicable to the description of components of the cloud server 106 and is not repeated herein for clarity of the description. Further, it should be appreciated that the cloud server 106 may include other components, sub-components, and devices commonly found in a computing device, which are not discussed above in reference to the computing device 102 and not discussed herein for clarity of the description.

Figure 2:
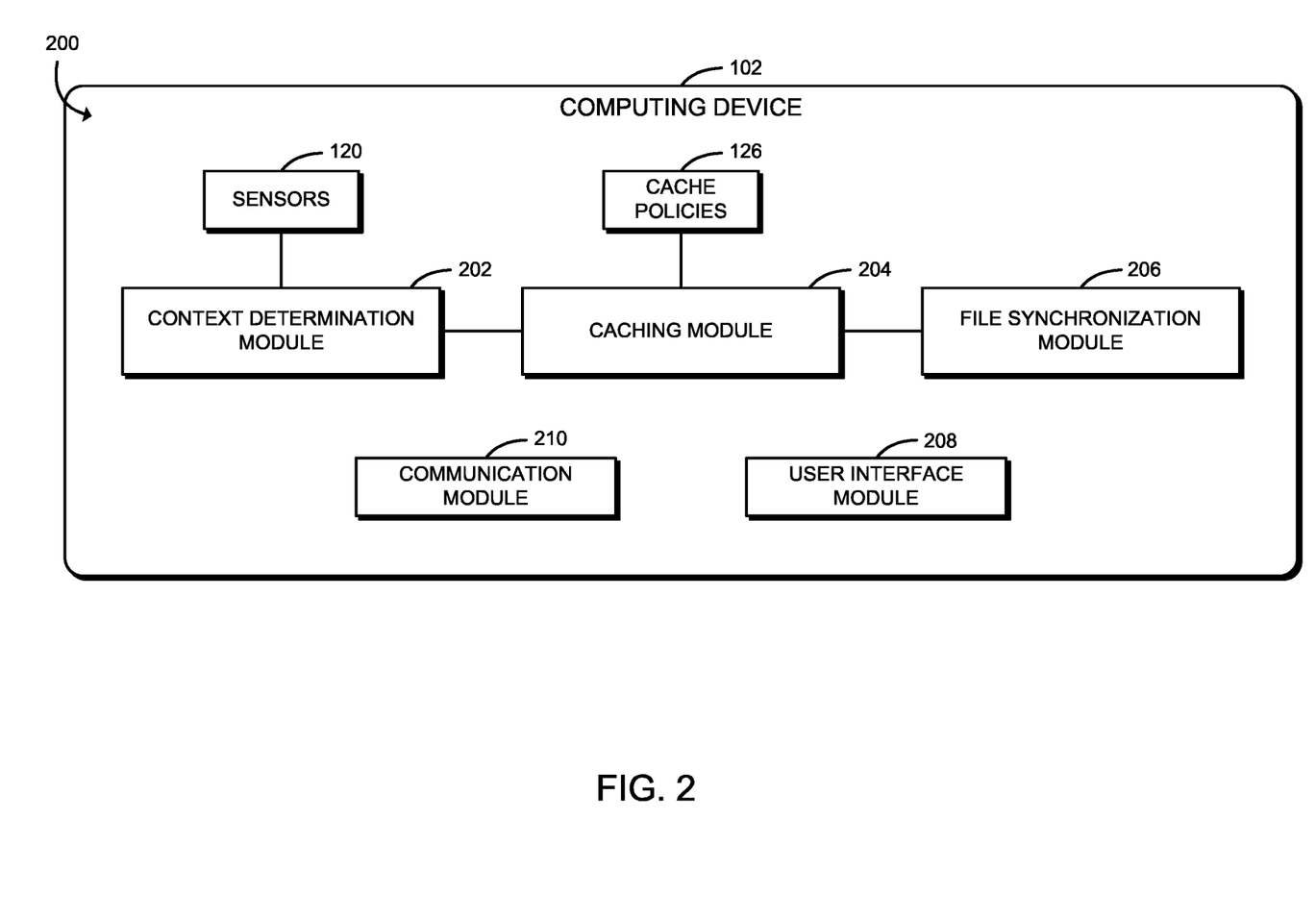
FIG. 2 is a simplified block diagram of at least one embodiment of an environment of a computing device of the system of FIG. 1.

Referring now to FIG. 2, in use, the computing device 102 establishes an environment 200 for predictive file caching and synchronization. The illustrative environment 200 of the computing device 102 includes a context determination module 202, a caching module 204, a file synchronization module 206, a user interface module 208, and a communication module 210. The various modules of the environment 200 may be embodied as hardware, software, firmware, or a combination thereof. For example, the various modules, logic, and other components of the environment 200 may form a portion of, or otherwise be established by, the processor 110 or other hardware components of the computing device 102. As such, in some embodiments, one or more of the modules of the environment 200 may be embodied as a circuit or collection of electrical devices (e.g., a context determination circuit, a caching circuit, a file synchronization circuit, a user interface circuit, and/or a communication circuit). Additionally, in some embodiments, one or more of the illustrative modules may form a portion of another module and/or one or more of the illustrative modules may be independent of one another.

The context determination module 202 is configured to receive sensor data generated by the sensors 120, analyze the received sensor data, and determine a context of the computing device 102. For example, the context determination module 202 may determine the location of the computing device 102, the network connectivity state, events on the user's calendar, network bandwidth, available storage (e.g., in the memory 114 and/or the data storage 116), the current time, device capabilities, executing applications, and/or other characteristics of the computing device 102.

The caching module 204 is configured to determine files to store to and/or delete from the file cache 124 (e.g., based on the context of the computing device 102 and/or the cache policies 126). In doing so, the caching module 204 may identify files based on access patterns of a user of the computing device 102. For example, in some embodiments, the caching module 204 may identify a predetermined number of files most recently accessed by the user. Further, in the illustrative embodiment, the caching module 204 identifies files to store and/or delete from the file cache 124 that are similar to (e.g., have similar characteristics) other files recently (e.g., currently) accessed by the user. It should be appreciated that the caching module 204 may determine "similarity" between various files in any suitable way. For example, in some embodiments, files having common file names, common file types, and/or common keywords in the files may be considered to be "similar" or related to one another.

The file synchronization module 206 is configured to retrieve files to cache from the cloud server 106 and transmit updated/modified files to the cloud server 106 to ensure file synchronization within the system 100. For example, the file synchronization module 206 may retrieve a file from the cloud server 106 and store the file to the file cache 124. The user may access the file, for example, while the computing device 102 is offline (e.g., disconnected from the network 104) and modify the file. As such, the file synchronization module 206 may update the cloud server 106 with the modified file (e.g., when the computing device 102 is back online).

The user interface module 208 permits a user of the computing device 102 to interact with the computing device 102. For example, as described above, in some embodiments, the computing device 102 may include a user cache policy 128. Further, in some embodiments, the user may override one or more rules of an enterprise cache policy 130. As such, the user interface module 208 may interpret and process inputs provided by the user.

The communication module 210 handles the communication between the computing device 102 and other computing devices of the system 100 (e.g., the cloud server 106). For example, as described herein, the computing device 102 may retrieve files from and store files to the cloud server 106 in order to perform predictive file caching and synchronization.

Figure 3:
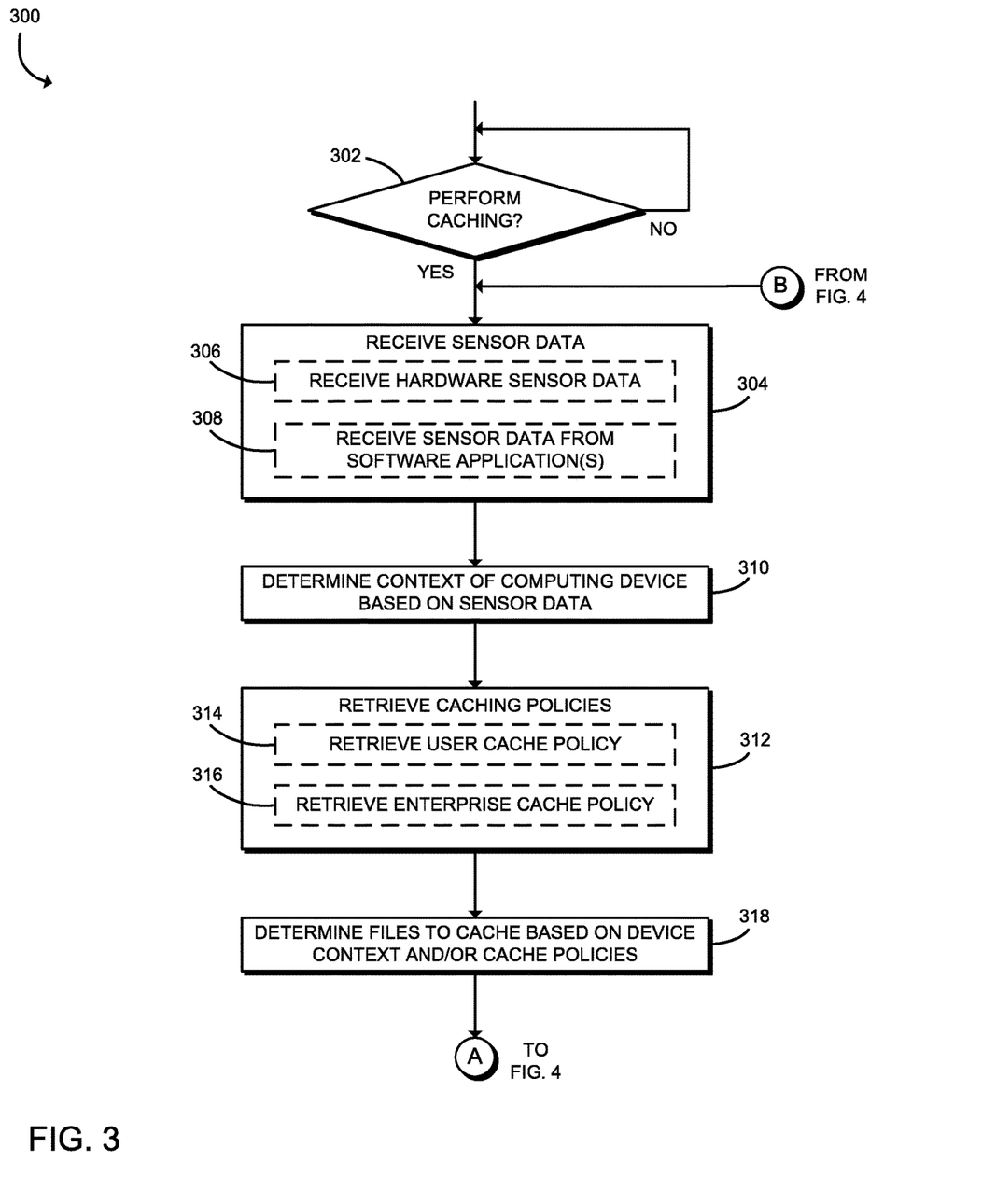
FIGS. 3-4 is a simplified flow diagram of at least one embodiment of a method for file caching and synchronization.
Figure 4:
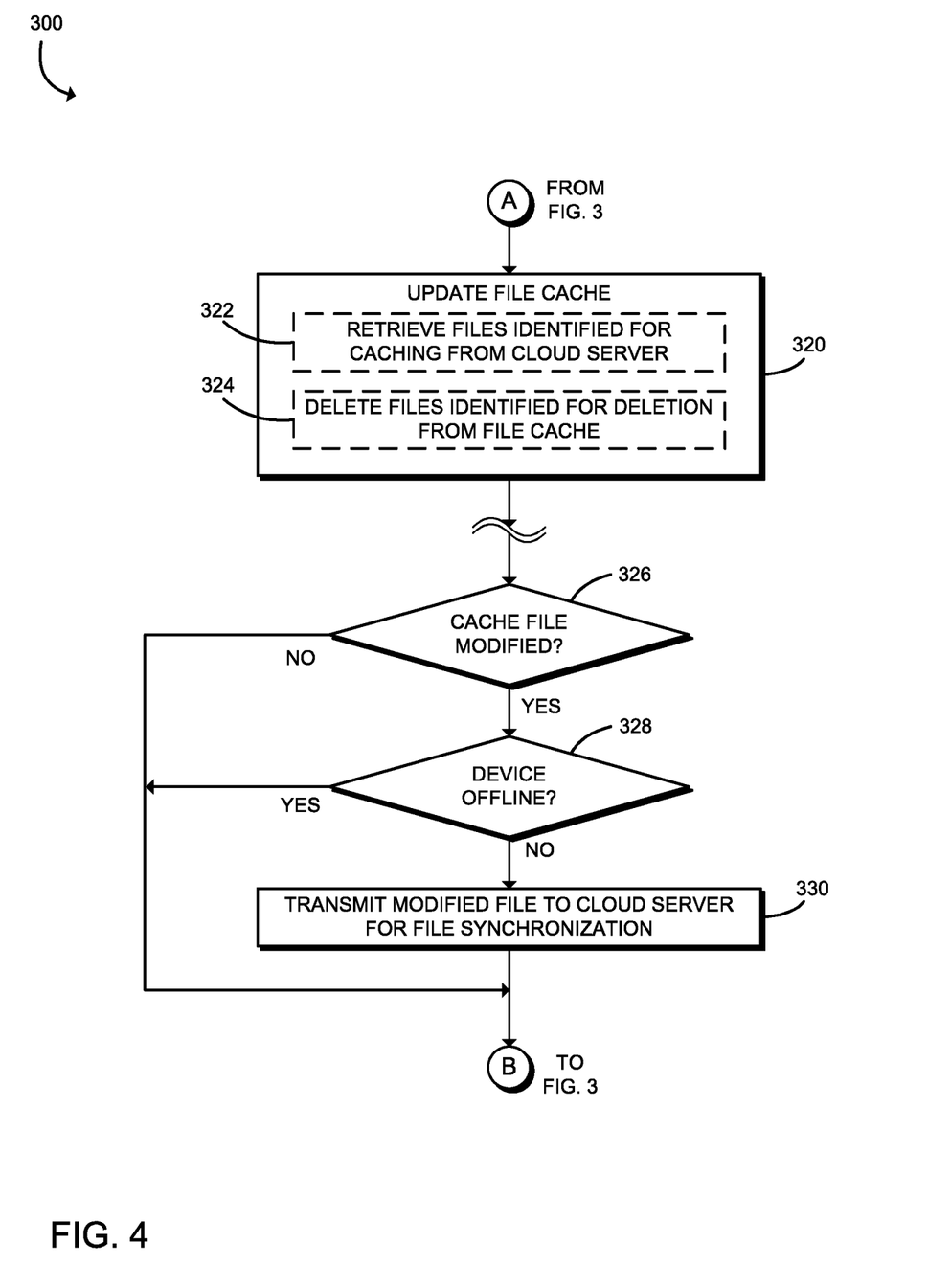

Referring now to FIGS. 3-4, in use, the computing device 102 may execute a method 300 for file caching and synchronization. The illustrative method 300 begins with block 302 of FIG. 3 in which the computing device 102 determines whether to perform predictive caching. If so, in block 304, the computing device 102 receives sensor data generated by the sensors 120. As described above, the sensor 120 are configured to generate data/signals indicative of an environment or context of the computing device 102 and/or user of the computing device 102. In particular, in block 306, the computing device 102 may receive hardware sensor data generated by one or more hardware sensors of the computing device 102. For example, the computing device 102 may receive data indicative of a location of the computing device 102, a hardware state of one or more components of the computing device 102, a physical environment of the computing device 102, and/or other features, parameters, and characteristics suitable for performing the functions described herein. Further, in block 308, the computing device 102 may receive sensor data from one or more software applications and/or other software sensor data. For example, the computing device 102 may receive data indicative of an execution state of a particular software application, results of an application execution, and/or other software data (e.g., calendar events) suitable for performing the functions described herein.

In block 310, the computing device 102 determines the context of the computing device 102 based on the received sensor data. It should be appreciated that the computing device 102 may analyze the sensor data of the computing device 102 using any suitable technique, algorithm, and/or mechanism suitable for determining contextual information based on sensor data. Depending on the particular embodiment, the context and contextual parameters utilized and/or identified by the computing device 102 may differ. For example, in various embodiments, the computing device 102 may determine the location of the computing device 102 (e.g., based on GPS data, imaging techniques, and/or other suitable algorithms), the network connectivity state of the computing device 102 (e.g., whether the computing device 102 is communicatively coupled to the network 104 and/or the cloud server 106 at a particular point in time), upcoming events the user is to attend (e.g., based on the user's virtual calendar), available network bandwidth, available storage, the current time, device capabilities (e.g., maximum processing capacity), currently executing applications, and/or other characteristics and contextual parameters of the computing device 102. In some embodiments, the computing device 102 may generate a contextual profile of the computing device 102 and/or a particular user of the computing device 102 based on the determined context.

In block 312, the computing device 102 retrieves one or more cache policies 126 of the computing device 102 and/or of the user of the computing device 102. For example, in block 314, the computing device 102 may retrieve a user cache policy 128 (i.e., a user-defined cache policy) for a particular user of the computing device 102 (e.g., the current user). Further, in block 316, the computing device 102 may retrieve an enterprise cache policy 130 in some embodiments. As described above, the cache policies 126 may include rules for caching particular files based on one or more parameters of a file, contextual data (e.g., of the computing device 102), and/or other suitable information. For example, in some embodiments, the cache policies 126 may include rules that are based on device type, capacity, available storage, network connectivity, location, time, user context, environment, and/or other characteristics.

Figure 5:
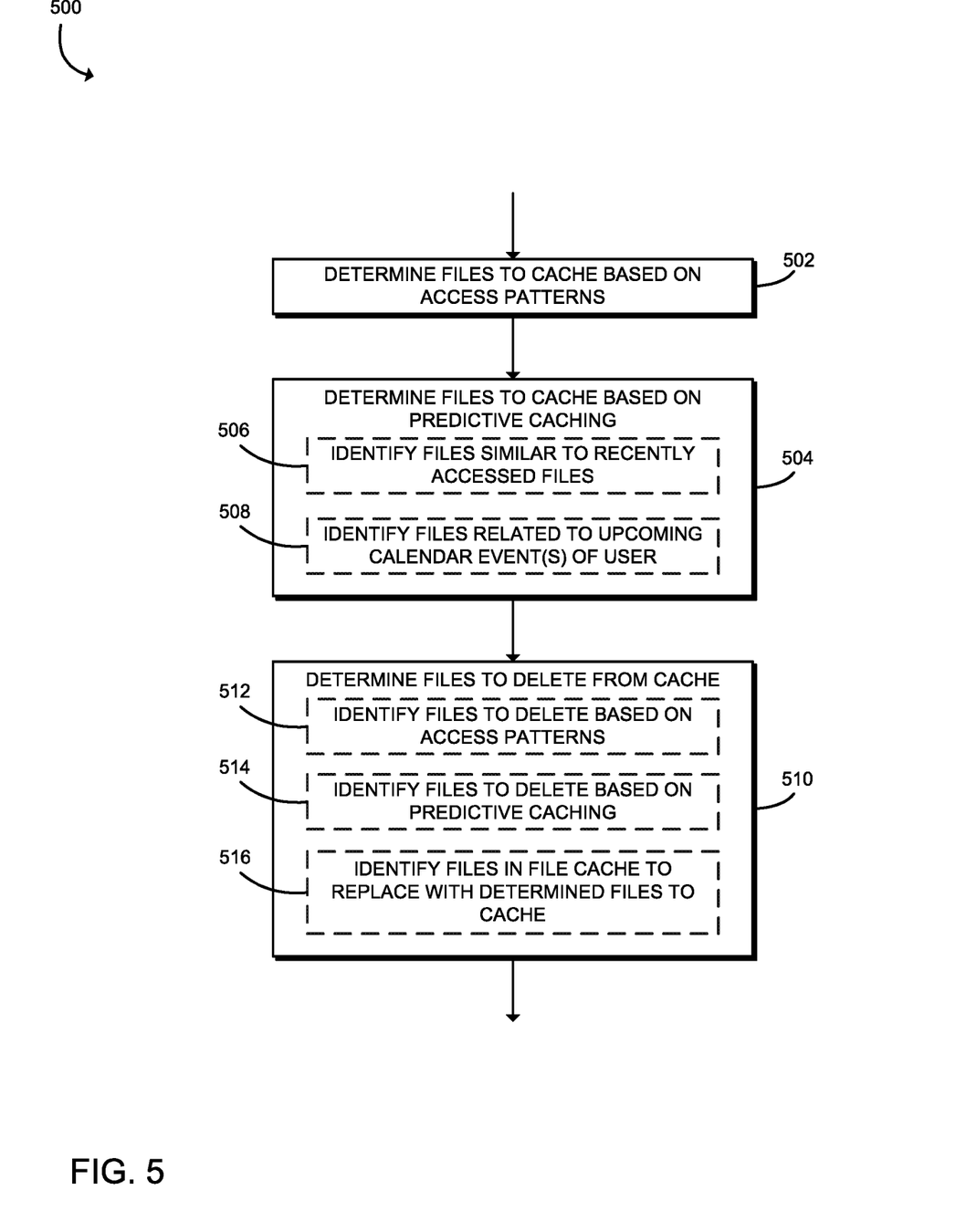
FIG. 5 is a simplified flow diagram of at least one embodiment of a method for determining files to cache.

In block 318, the computing device 102 determines which files to cache (e.g., to store to the file cache 124 and/or delete from the file cache 124) based on the determined context of the computing device 102 and/or the cache policies 126. To do so, the computing device 102 may execute a method 500 as shown in FIG. 5. The illustrative method 500 begins with block 502 in which the computing device 102 determines which files to cache based on access patterns. For example, the computing device 102 may identify a predetermined number of files most recently accessed by the computing device 102 or a particular user of the computing device 102, which may be stored for a predetermined amount of time.

In block 504, the computing device 102 determines which files to cache based on predictive caching techniques. For example, in block 506, the computing device 102 may identifies files that are similar to files recently accessed by the computing device 102 or, more specifically, a particular user of the computing device 102. By doing so, in some embodiments, the computing device 102 may predict a user's needs based on the determined context. As indicated above, the computing device 102 may determine "similarity" between various files in any suitable way. For example, the computing device 102 may identify files (e.g., files stored in the cloud server 106) that have file names, file types, keywords (e.g., in the file itself), file size, timestamp(s), and/or other suitable file characteristics or metadata that match or nearly match corresponding characteristics of files recently/currently accessed by the computing device 102 or a particular user. For example, if the computing device 102 determines that a user is digitally preparing taxes (e.g., via tax preparation software), the computing device 102 may identify files for caching to the file cache 124 that are related to the preparation of the user's taxes (e.g., the tax files for the preceding year). In another embodiment, the computing device 102 may identify roadmap files, project plans, presentations, journal articles, and/or other files related to work on particular project. It should be appreciated that the file characteristics used to determine whether two files are similar may be embodied as any characteristic(s) or feature(s) of the associated files that may be analyzed and compared to determine whether the particular characteristic(s) of the individual files match within a reference variance of each other. For example, the file characteristics may include access date/time, related subject matter, content, and/or other suitable file characteristics.

Further, in block 508, the computing device 102 may identify files related to one or more upcoming events/meetings identified on a user's virtual calendar. For example, the computing device 102 may determine that the user will be flying (e.g., offline) to an out-of-town meeting with investors and identify files for caching related to that meeting (e.g., to enable the user to work offline such as during flight). As such, it will be appreciated that, in some embodiments, the computing device 102 may identify files to cache that have not recently (or have never) been accessed by the user of the computing device 102.

In block 510, the computing device 102 may determines which files to delete, if any, from the file cache 124. In doing so, in block 512, the computing device 102 may identify files to delete based on access patterns. For example, the computing device 102 may identify one or more least recently accessed files in the partition 604 or otherwise determine that one or more files should be deleted based on access patterns of the computing device 102 or the user. In block 514, the computing device 102 may identify files to delete based on predictive caching. For example, the computing device 102 may determine (e.g., based on the device context and the cache policies 126) that the computing device 102 is currently in an unsecure location and, therefore, identify one or more confidential files for deletion from the file cache 124 for security purposes. Further, in some embodiments, in block 516, the computing device 102 may identify files currently stored in the file cache 124 that should be deleted to make "room" for or be overwritten by the newly identified files to cache. Of course, in some embodiments, the computing device 102 may store the newly identified/determined files to the file cache 124 without deleting other files already stored in the file cache 124. Further, in embodiments in which the file cache 124 is dynamic as described above, the computing device 102 may delete/overwrite one or more files in one partition 604, 606 to make "room" for one or more files to be stored to the other partition 604, 606.

Returning to FIG. 3, it should be appreciated that the computing device 102 may utilize any suitable technique, algorithm, and/or mechanism for determining which files to cache (i.e., which files to store to the file cache 124 and/or to delete from the file cache 124) based on the device context and/or the cache policies 126. The method 300 advances to block 320 of FIG. 4 in which the computing device 102 updates the file cache 124. In doing so, in block 322, the computing device 102 may retrieve the files identified for caching from the cloud server 106 and store those files to the file cache 124 (e.g., to the corresponding partition 604, 606 of the file cache 124). Further, in block 324, the computing device 102 may delete the files identified for deletion from the file cache 124. In some embodiments, the computing device 102 may do so by writing all zeros, writing all ones, or writing a random bit pattern to the memory location at which the file identified for deletion is stored. Of course, as described above, in other embodiments, the computing device 102 may alternatively permit such files to be directly overwritten by one or more of the files identified for caching.

As described above, in some embodiments, the illustrative techniques allow the computing device 102 to ensure file synchronization with the cloud server 106. As such, in block 326, the computing device 102 determines whether one or more files stored in the file cache 124 have been modified since being retrieved from the cloud server 106. If so, the computing device 102 determines whether the computing device 102 is offline (e.g., disconnected from the cloud server 106) in block 328. If the computing device 102 is offline or otherwise unable to communicate with the cloud server 106, the method 300 returns to block 328 in which the computing device 102 again determines whether the computing device 102 is offline. In other words, in such embodiments, the method 300 waits to proceed until the computing device 102 is again communicatively coupled to the cloud server 106. Of course, the computing device 102 may attempt to reconnect to the cloud server 106 periodically, repeatedly, and/or in response to user inputs or other conditions. If the computing device 102 determines, in block 328, that it is communicatively coupled to the cloud server 106, the computing device 102 transmits the modified file(s) to the cloud server 106 for file synchronization in block 330.

The method 300 returns to block 304 of FIG. 3 in which the computing device 102 again receives sensor data of the computing device 102 in order to determine the device context. Similarly, if the computing device 102 determines, in block 330, that no file stored in the file cache 124 has been modified (i.e., all files are synchronized), the method 300 also returns to block 304 of FIG. 3 to receive sensor data. Of course, it should be appreciated that, in some embodiments, if the computing device 102 determines that is has been disconnected from the cloud server 106, the method 300 may pause at any point until the computing device 102 has reconnected with the cloud server 106.

EXAMPLES

Illustrative examples of the technologies disclosed herein are provided below. An embodiment of the technologies may include any one or more, and any combination of, the examples described below.

Example 1 includes a computing device for predictive file caching, the computing device comprising a file cache that includes (i) a first partition to store files identified to have similar characteristics to files recently accessed by a user of the computing device and (ii) a second partition to store files identified based on access patterns of the user; a context determination module to (i) receive sensor data generated by one or more sensors of the computing device and (ii) determine a device context of the computing device based on the sensor data; and a caching module to (i) determine, based on the device context, a file to cache that has similar characteristics to another file recently accessed the user and (ii) store the determined file to the first partition of the file cache.

Example 2 includes the subject matter of Example 1, and wherein to receive the sensor data comprises to receive sensor data generated by one or more hardware sensors of the computing device.

Example 3 includes the subject matter of any of Examples 1 and 2, and wherein to receive the sensor data comprises to receive data from one or more software applications.

Example 4 includes the subject matter of any of Examples 1-3, and wherein to determine the file to cache comprises to determine the file to cache based on the device context and a cache policy defined by the user; and wherein the cache policy includes user-defined rules for caching files.

Example 5 includes the subject matter of any of Examples 1-4, and wherein to determine the file to cache comprises to determine the file to cache based on the device context and an enterprise cache policy; and wherein the enterprise cache policy includes rules for caching files in an enterprise environment of the computing device.

Example 6 includes the subject matter of any of Examples 1-5, and further including a file synchronization module to retrieve the file to cache from a cloud server.

Example 7 includes the subject matter of any of Examples 1-6, and wherein the file synchronization module is further to transmit the cached file to the cloud server in response to a determination that the file has been modified.

Example 8 includes the subject matter of any of Examples 1-7, and wherein the caching module is to determine a file to delete from the file cache based on the device context.

Example 9 includes the subject matter of any of Examples 1-8, and wherein to determine the file to delete from the cache file comprises to determine a file to delete from the second partition based on access patterns of the user.

Example 10 includes the subject matter of any of Examples 1-9, and wherein to determine the file to delete from the cache file comprises to determine a file to delete from the first partition.

Example 11 includes the subject matter of any of Examples 1-10, and wherein to determine the file to cache comprises to identify files that relate to an upcoming event indicated on a virtual calendar of the user.

Example 12 includes the subject matter of any of Examples 1-11, and wherein the characteristics include file metadata.

Example 13 includes the subject matter of any of Examples 1-12, and wherein the characteristics include at least one of a file name, a file type, a file size, a file timestamp, or a keyword in the file.

Example 14 includes a method for predictive filing caching by a computing device, the method comprising receiving, by the computing device, sensor data generated by one or more sensors of the computing device; determining, by the computing device, a device context of the computing device based on the sensor data; determining, by the computing device and based on the device context, a file to cache that has similar characteristics to another file recently accessed by a user of the computing device; and storing, by the computing device, the determined file to a first partition of a file cache of the computing device, wherein the file cache includes the first partition to store files identified to have similar characteristics to files recently accessed by the user and a second partition to store files identified based on access patterns of the user.

Example 15 includes the subject matter of Example 14, and wherein receiving the sensor data comprises receiving sensor data generated by one or more hardware sensors of the computing device.

Example 16 includes the subject matter of any of Examples 14 and 15, and wherein receiving the sensor data comprises receiving data from one or more software applications.

Example 17 includes the subject matter of any of Examples 14-16, and wherein determining the file to cache comprises determining the file to cache based on the device context and a cache policy defined by the user, wherein the cache policy includes user-defined rules for caching files.

Example 18 includes the subject matter of any of Examples 14-17, and wherein determining the file to cache comprises determining the file to cache based on the device context and an enterprise cache policy, wherein the enterprise cache policy includes rules for caching files in an enterprise environment of the computing device.

Example 19 includes the subject matter of any of Examples 14-18, and further including retrieving, by the computing device, the file to cache from a cloud server.

Example 20 includes the subject matter of any of Examples 14-19, and further including transmitting, by the computing device, the cached file to the cloud server in response to determining the file has been modified.

Example 21 includes the subject matter of any of Examples 14-20, and further including determining, by the computing device and based on the device context, a file to delete from the file cache.

Example 22 includes the subject matter of any of Examples 14-21, and wherein determining the file to delete from the cache file comprises determining a file to delete from the second partition based on access patterns of the user.

Example 23 includes the subject matter of any of Examples 14-22, and wherein determining the file to delete from the cache file comprises determining a file to delete from the first partition.

Example 24 includes the subject matter of any of Examples 14-23, and wherein determining the file to cache comprises identifying files relating to an upcoming event indicated on a virtual calendar of the user.

Example 25 includes the subject matter of any of Examples 14-24, and wherein the characteristics include file metadata.

Example 26 includes the subject matter of any of Examples 14-25, and wherein the characteristics include at least one of a file name, a file type, a file size, a file timestamp, or a keyword in the file.

Example 27 includes a computing device comprising a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for predictive file caching, the computing device comprising means for receiving sensor data generated by one or more sensors of the computing device; means for determining a device context of the computing device based on the sensor data; means for determining, based on the device context, a file to cache that has similar characteristics to another file recently accessed by a user of the computing device; and means for storing the determined file to a first partition of a file cache of the computing device, wherein the file cache includes the first partition to store files identified to have similar characteristics to files recently accessed by the user and a second partition to store files identified based on access patterns of the user.

Example 31 includes the subject matter of Example 30, and wherein the means for receiving the sensor data comprises means for receiving sensor data generated by one or more hardware sensors of the computing device.

Example 32 includes the subject matter of any of Examples 30 and 31, and wherein the means for receiving the sensor data comprises means for receiving data from one or more software applications.

Example 33 includes the subject matter of any of Examples 30-32, and wherein the means for determining the file to cache comprises means for determining the file to cache based on the device context and a cache policy defined by the user, wherein the cache policy includes user-defined rules for caching files.

Example 34 includes the subject matter of any of Examples 30-33, and wherein the means for determining the file to cache comprises means for determining the file to cache based on the device context and an enterprise cache policy, wherein the enterprise cache policy includes rules for caching files in an enterprise environment of the computing device.

Example 35 includes the subject matter of any of Examples 30-34, and further including means for retrieving the file to cache from a cloud server.

Example 36 includes the subject matter of any of Examples 30-35, and further including means for transmitting the cached file to the cloud server in response to determining the file has been modified.

Example 37 includes the subject matter of any of Examples 30-36, and further including means for determining, based on the device context, a file to delete from the file cache.

Example 38 includes the subject matter of any of Examples 30-37, and wherein the means for determining the file to delete from the cache file comprises means for determining a file to delete from the second partition based on access patterns of the user.

Example 39 includes the subject matter of any of Examples 30-38, and wherein the means for determining the file to delete from the cache file comprises means for determining a file to delete from the first partition.

Example 40 includes the subject matter of any of Examples 30-39, and wherein the means for determining the file to cache comprises means for identifying files relating to an upcoming event indicated on a virtual calendar of the user.

Example 41 includes the subject matter of any of Examples 30-40, and wherein the characteristics include file metadata.

Example 42 includes the subject matter of any of Examples 30-41, and wherein the characteristics include at least one of a file name, a file type, a file size, a file timestamp, or a keyword in the file.

The invention claimed is:

1. A computing device for predictive file caching, the computing device comprising:
   a file cache that includes (i) a first partition to store files identified to have similar characteristics to files recently accessed by a user of the computing device and (ii) a second partition to store files identified based on access patterns of the user;
   a context determination circuitry to (i) receive sensor data generated by one or more sensors of the computing device and (ii) determine a device context of the computing device based on the sensor data;
   a caching circuitry to (i) determine, based on the device context and an enterprise cache policy that includes rules for caching files in an enterprise environment of the computing device, a file to cache that has similar characteristics to another file recently accessed by the user, (ii) store the determined file to the first partition of the file cache, (iii) to determine a file to delete from the file cache based on detection that a physical location of the computing device is in an unsecure location based on sensor data; and (iv) dynamically adjust a size of one or more of the first partition or the second partition over time to reduce an amount of cached content on the computing device; and
   a user interface circuitry to override one or more rules of the enterprise cache policy based on user interaction with the computing device.

2. The computing device of claim 1, wherein to receive the sensor data comprises to receive sensor data generated by one or more hardware sensors of the computing device.

3. The computing device of claim 1, wherein to receive the sensor data comprises to receive data from one or more software applications.

4. The computing device of claim 1, wherein to determine the file to cache comprises to determine the file to cache based on the device context and a cache policy defined by the user; and wherein the cache policy includes user-defined rules for caching files.

5. The computing device of claim 1, further comprising a file synchronization circuitry to retrieve the file to cache from a cloud server.

6. The computing device of claim 5, wherein the file synchronization circuitry is further to transmit the cached file to the cloud server in response to a determination that the file has been modified.

7. The computing device of claim 1, wherein the caching circuitry is to determine a file to delete from the file cache based on the device context.

8. The computing device of claim 7, wherein to determine the file to delete from the cache file comprises to determine a file to delete from the second partition based on access patterns of the user.

9. The computing device of claim 7, wherein to determine the file to delete from the cache file comprises to determine a file to delete from the first partition.

10. The computing device of claim 1, wherein to determine the file to cache comprises to identify files that relate to an upcoming event indicated on a virtual calendar of the user.

11. The computing device of claim 1, wherein the characteristics include at least one of a file name, a file type, a file size, a file timestamp, or a keyword in the file.

12. The computing device of claim 1, wherein to determine a file to delete from the file cache is based on detection that a geographic location of the computing device is in an unsecure location based on sensor data.

13. One or more non-transitory, machine-readable storage media comprising a plurality of instructions stored thereon that, in response to execution by a computing device, cause the computing device to:

receive sensor data generated by one or more sensors of the computing device;

determine a device context of the computing device based on the sensor data;

determine, based on the device context and an enterprise cache policy that includes rules for caching files in an enterprise environment of the computing device, a file to cache that has similar characteristics to another file recently accessed by a user of the computing device;

store the determined file to a first partition of a file cache of the computing device, wherein the file cache includes the first partition to store files identified to have similar characteristics to files recently accessed by the user and a second partition to store files identified based on access patterns of the user;

determine a file to delete from the file cache based on detection that a physical location of the computing device is in an unsecure location based on the sensor data;

dynamically adjust a size of one or more of the first partition or the second partition over time to reduce an amount of cached content on the computing device; and override one or more rules of the enterprise cache policy based on user interaction with the computing device.

14. The one or more non-transitory, machine-readable storage media of claim 13, wherein to receive the sensor data comprises to receive sensor data generated by one or more hardware sensors of the computing device.

15. The one or more non-transitory, machine-readable storage media of claim 13, wherein to receive the sensor data comprises to receive data from one or more software applications.

16. The one or more non-transitory, machine-readable storage media of claim 13, wherein to determine the file to cache comprises to determine the file to cache based on the device context and a cache policy defined by the user, wherein the cache policy includes user-defined rules for caching files.

17. The one or more non-transitory, machine-readable storage media of claim 13, wherein the plurality of instructions further cause the computing device to:

retrieve the file to cache from a cloud server; and transmit the cached file to the cloud server in response to a determination that the file has been modified.

18. The one or more non-transitory, machine-readable storage media of claim 13, wherein the plurality of instructions further cause the computing device to determine a file to delete from the file cache based on the device context.

19. The one or more non-transitory, machine-readable storage media of claim 18, wherein to determine the file to delete from the cache file comprises to determine a file to delete from the second partition based on access patterns of the user.

20. The one or more non-transitory, machine-readable storage media of claim 18, wherein to determine the file to delete from the cache file comprises to determine a file to delete from the first partition.

21. The one or more non-transitory, machine-readable storage media of claim 13, wherein to determine the file to cache comprises to identify files that relate to an upcoming event indicated on a virtual calendar of the user.

22. A method for predictive filing caching by a computing device, the method comprising:

receiving, by the computing device, sensor data generated by one or more sensors of the computing device;

determining, by the computing device, a device context of the computing device based on the sensor data;

determining, by the computing device and based on the device context and an enterprise cache policy that includes rules for caching files in an enterprise environment of the computing device, a file to cache that has similar characteristics to another file recently accessed by a user of the computing device;

storing, by the computing device, the determined file to a first partition of a file cache of the computing device, wherein the file cache includes the first partition to store files identified to have similar characteristics to files recently accessed by the user and a second partition to store files identified based on access patterns of the user;

determining, by the computing device, a file to delete from the file cache based on detection that a physical location of the computing device is in an unsecure location based on the sensor data;

dynamically adjust a size of one or more of the first partition or the second partition over time to reduce an amount of cached content on the computing device; and overriding one or more rules of the enterprise cache policy based on user interaction with the computing device.

23. The method of claim 22, further comprising determining, by the computing device, a file to delete from the second partition based on access patterns of the user and the device context.

24. The method of claim 22, wherein determining the file to cache comprises identifying files relating to an upcoming event indicated on a virtual calendar of the user.

\* \* \* \* \*